Sept. 6, 1949.  W. W. SLOANE  2,481,047
MOUNTINGS FOR FLUID PUMPS
Filed May 4, 1945  2 Sheets-Sheet 1
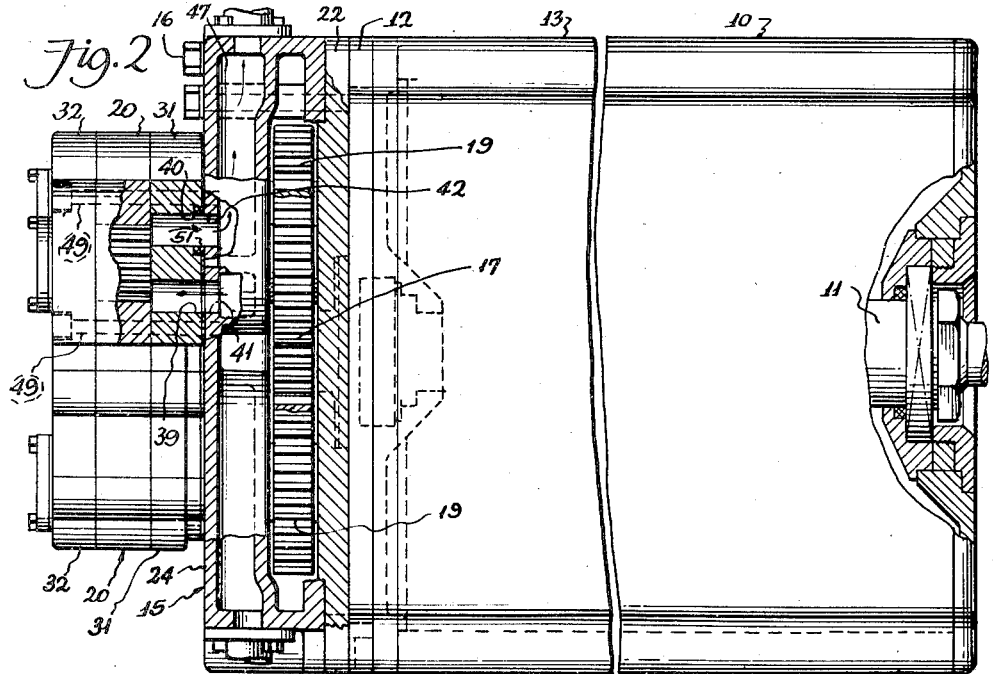
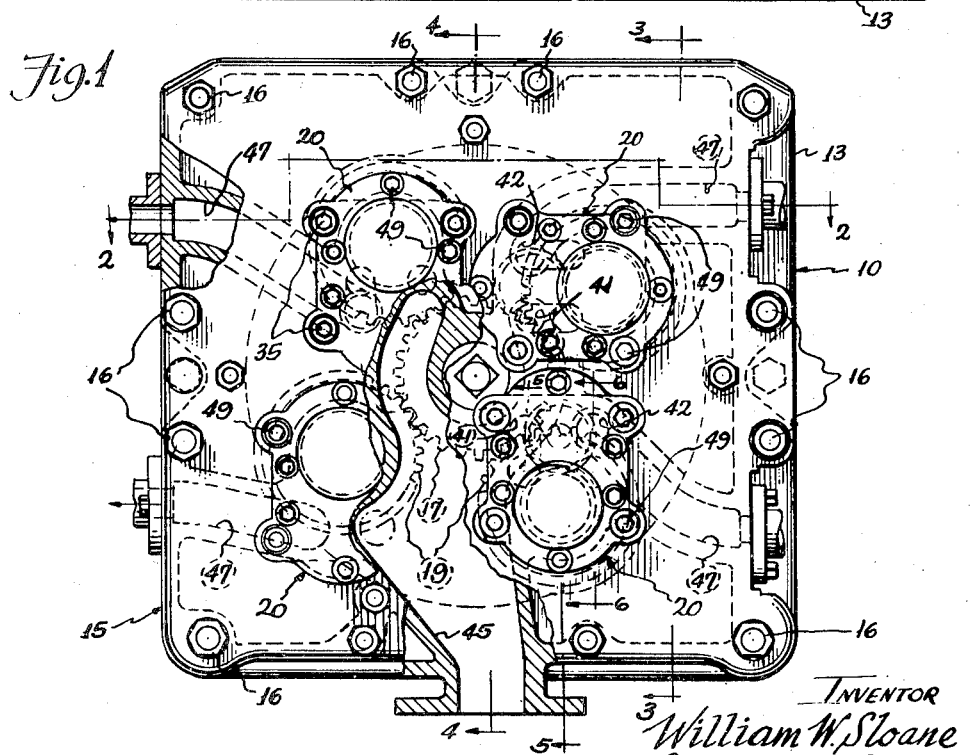
INVENTOR
William W. Sloane
Clarence F. Poole
ATTORNEY Sept. 6, 1949. W. W. SLOANE 2,481,047
MOUNTINGS FOR FLUID PUMPS
Filed May 4, 1945 2 Sheets-Sheet 2

INVENTOR
William W. Sloane
Clarence F. Poole
ATTORNEY

Patented Sept. 6, 1949

2,481,047

UNITED STATES PATENT OFFICE 2,481,047

MOUNTINGS FOR FLUID PUMPS

William W. Sloane, Chicago, Ill., assignor to Goodman Manufacturing Company, Chicago, Ill., a corporation of Illinois Application May 4, 1945, Serial No. 591,896

7 Claims. (Cl. 103—4)

This invention relates to improvements in mountings for fluid pumps and more particularly relates to a simplified and improved means for mounting a plurality of fluid pumps on the end of the casing of a drive motor for the pumps.

The principal objects of my invention are to provide a new and improved simplified form of means for mounting a plurality of fluid pumps on the end of the casing of the drive motor for the pumps, so arranged that the mounting means for the pumps may form a manifold for the supply of fluid to and the discharge of fluid from the pumps, so as to eliminate all external piping between the pumps and the mounting, and may also form a bearing support for the gearing for driving the pumps from the motor.

These and other objects of my invention will appear from time to time as the following specification proceeds and with reference to the accompanying drawings wherein:

Figure 1 is an end view of a pump mounting constructed in accordance with my invention shown as being mounted on the end of a motor casing and having a plurality of pumps mounted thereon, with certain parts of the pumps and mounting broken away and certain other parts thereof shown in section;

Figure 2 is a fragmentary sectional view taken substantially along line 2—2 of Figure 1;

Figure 3:
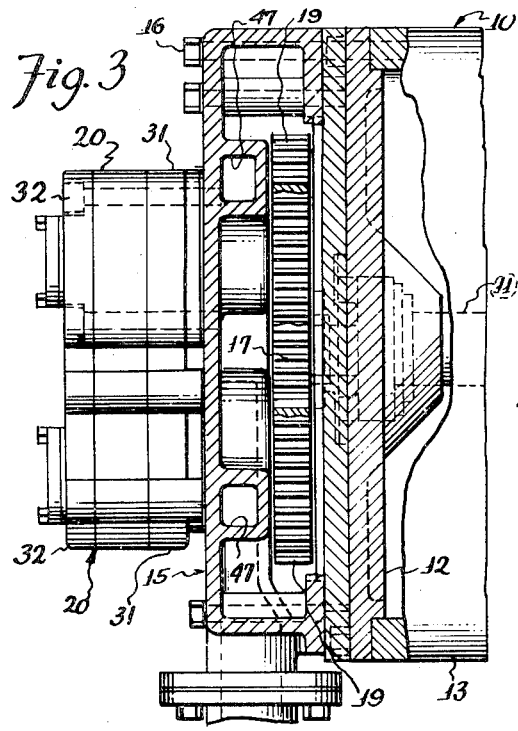
Figure 3 is a fragmentary sectional view taken substantially along line 3—3 of Figure 1.
Figure 4:
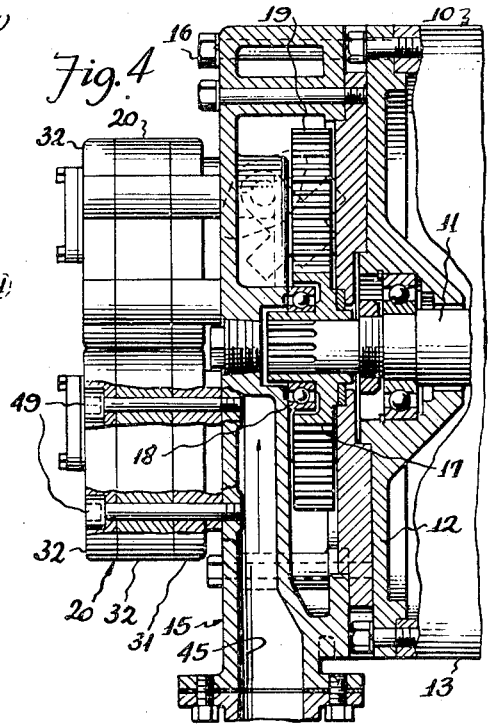
Figure 4 is a fragmentary sectional view taken substantially along line 4—4 of Figure 1.

In the drawings, a pump drive motor 10, herein shown as being a well known form of electric motor, has an armature shaft 11 which extends from one end of an end plate 12 of a casing 13 of said motor into a housing 15, which is secured to said end plate and projects from an end of said motor. Studs 16, 16 having nuts threaded on the outer ends thereof are threaded in said end plate and extend through said housing to mount said housing on said end plate and motor. A motor pinion 17 disposed within said housing is splined on the end of said armature shaft. End thrust of said armature shaft is taken up by a thrust ball bearing 18 mounted on the hub of said motor pinion and engaging a stationary part of said housing with its outer race. Said motor pinion meshes with a plurality of spur gears 19, 19, each of which spur gears forms a driving means for a fluid pump 20.

Figure 5:
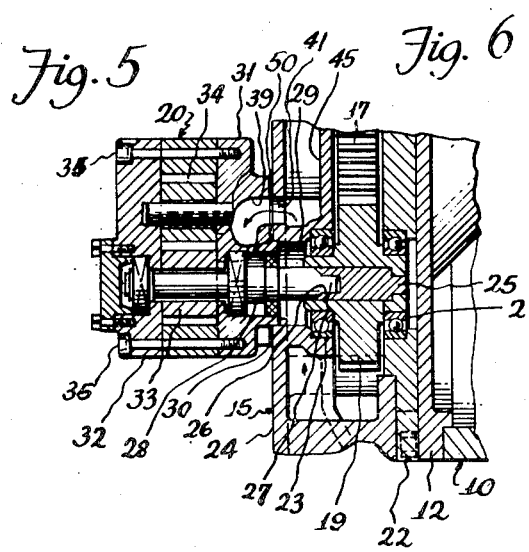
Figure 5 is a fragmentary sectional view taken substantially along line 5—5 of Figure 1.
Figure 6:
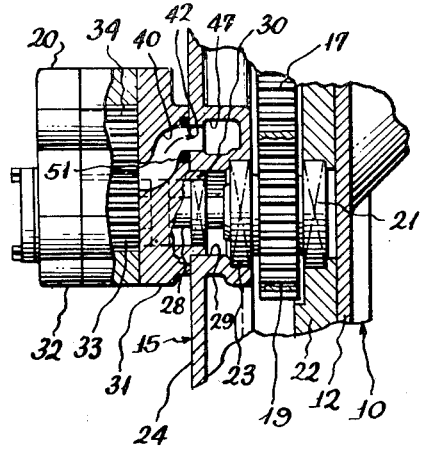
Figure 6 is a fragmentary sectional view taken substantially along line 6—6 of Figure 1.

Each spur gear 19 has a hub projecting from each side thereof and is journaled on its inner hub on a ball bearing 21 mounted in an inner end plate 22 of said housing. A ball bearing 23 mounted in an outer portion 24 of the housing 15 forms a means for journaling the outer hub of said spur gear in said housing. As herein shown, a shaft 25 is mounted within the hub of each of said spur gears (see Figure 5). The outer end of said shaft is slotted, and the slotted portion thereof forms an irregularly formed socket 26 adapted to be engaged with a corresponding projecting end 27 of a pump drive shaft 28, for driving said shaft from said spur gear.

The outer portion 24 of the housing 15 is provided with a plurality of circular openings 29, 29, each of which openings is concentric with the hub of a spur gear 19 and is of a slightly larger diameter than the diameter of the hub of said spur gear. Each of said openings is adapted to receive an inwardly projecting boss 30 of an inner end plate 31 of a casing 32 of the pump 20, which serves to register the projecting end 27 of the shaft 28 with the socket 26, and to register the suction and delivery ports of said pump into position to be aligned with corresponding ports formed in the end of said housing, as will hereinafter more clearly appear as this specification proceeds.

The pumps 20, 20 are herein shown as being well known forms of gear pumps and each includes the casing 32 having a pair of meshing gears 33, 34 journaled therein, the gear 33 being mounted on and driven from the shaft 28. Said casing is of a sectional construction and the sections thereof are secured together by means of cap screws 35, 35. The inner end plate 31 of said casing is adapted to abut the outer side of the outer portion 24 of the housing 15. Said inner end plate of said pump besides having the boss 30 formed integrally therewith, also has a suction port 39 extending therethrough and leading into the pump to the suction side of the pump gears 33, 34. Said end plate also has a pressure port 40 leading outwardly from the pump from the pressure side of said pump gears. Said suction and pressure ports extend in a direction parallel to the shaft 28 and are open to the inner face of said end plate so as to register with corresponding suction and pressure ports 41 and 42, respectively, which are formed in the outer portion 24 of the housing 15.

One suction port 41 is provided in the outer portion 24 of the housing 15 for each pump 20. Said suction ports lead to a centrally disposed suction manifold 45 formed within said housing and extending from an outer side of said housing inwardly along and towards the center thereof (see Figure 1).

Likewise, one pressure port 42 is provided in the outer portion 24 of the housing 15 for each pump 20. Each of said pressure ports leads to a pressure passageway 47 formed within said housing and leading to an outer side of said housing, to deliver fluid under pressure from a side of said housing. As herein shown, two of said pressure passageways lead to one side of said housing while the other two passageways lead to the opposite side of said housing, although said pressure ports and passageways may be arranged in any convenient manner so that fluid under pressure may be separately delivered by said pumps to a plurality of hydraulic operating devices.

The outer portion 24 of the housing 15 is provided with a plurality of threaded apertures, which are disposed around each set of suction and pressure ports 41 and 42. Said threaded apertures are adapted to receive the threaded ends of cap screws 49, 49 extending through the casing 32 of a pump 20, for detachably securing said pump to said outer portion of said housing. Said threaded apertures are so located that when the boss 30 is in engagement with the periphery of the opening 29 and the pump is positioned so that each of said cap screws may be threaded within its threaded aperture, the pressure port 40 of the respective pump will register for engagement with the pressure port 42 in the outer portion 24 of the housing 15, and the suction port 39 for the same pump will register with the suction port 41 in said outer portion of said housing. Also, the projecting portion 27 of the shaft 28 will be in position to engage the socket 26.

A suitable packing member 50 is inserted between the outer side of the outer portion 24 of the housing 15 and the inner end plate 31 of the pump casing 32 and extends around the suction port 39, to prevent the leakage of fluid at the point where said inner end plate engages said outer portion 24 of said housing. Likewise, a suitable packing member 51 is provided in the inner end plate 31 around the port opening of the pressure port 40, and abuts the outer portion 24 of said housing and encircles the pressure port 42, to prevent the leakage of fluid at the abutting surface between said inner end plate 31 and the outer side of the outer portion 24 of said housing 15.

It may be seen from the foregoing that a simple and improved drive means and mounting for a plurality of pumps on the end of a motor casing has been provided, which permits the pumps to be simultaneously driven from the shaft of the motor 10, and forms a bearing support for the drive gearing for the pumps, and which has a suction manifold and pressure passageways formed therein leading to ports on the outer side thereof and so arranged that each pump may readily be attached to the outer side of said mounting and obtain fluid through the suction manifold formed in said mounting and supply fluid under pressure through the pressure passageways formed in said mounting without any external piping between said pumps and mounting.

While I have herein shown and described one form in which my invention may be embodied, it will be understood that the construction thereof and the arrangement of the various parts may be altered without departing from the spirit and scope thereof. Furthermore, I do not wish to be construed as limiting my invention to the specific embodiment illustrated, excepting as it may be limited in the appended claims.

I claim as my invention:

1. In a pump mounting a fluid pump having a plurality of rotors, a casing, a shaft journaled in said casing and having a gear mounted thereon, a second gear meshing with said gear, said gears forming the rotors of said pump and said casing including an end plate having suction and pressure ports communicating with the suction and pressure sides of said gears for supplying fluid to and conducting fluid from said gears and extending through said end plate and out the outer face thereof in a direction parallel to the longitudinal axis of said shaft, a drive motor for said pump including a casing having a motor shaft journaled therein, spur gearing driven by said motor shaft and including a driven spur gear having means engageable with said pump shaft, for driving said pump, a housing secured to the end of said casing and adapted to form a housing and bearing support means for said spur gearing, said housing having an apertured portion concentric with said driven spur gear opening to the end of said housing opposite from said motor and having suction and pressure passageways formed therein with inlet and outlet ports leading from and into said housing and disposed adjacent and opening to the same end of said housing as said apertured portion of said housing, said end plate of said pump being adapted to abut the end of said housing opposite from said motor and having a hollow boss extending therefrom and arranged concentrically with said shaft and adapted to engage within said apertured portion, to align said pump drive shaft with said drive means carried by said gear, to permit said pump to be driven by said gear and to form a guide to align said inlet and outlet ports of said pump with said inlet and outlet ports of said housing, for detachably securing said pump casing to said housing and to receive fluid from and transmit fluid through said housing without the use of external piping means.

2. In a pump mounting a fluid pump having a plurality of rotors, a casing, a shaft journaled in said casing and having a gear mounted thereon, a second gear meshing with said gear, said gears forming the rotors of said pump and said casing including an end plate having suction and pressure ports communicating with the suction and pressure sides of said gears for supplying fluid to and conducting fluid from said gears and extending through said end plate and out the outer face thereof in a direction parallel to the longitudinal axis of said shaft, a drive motor for said pump including a casing having a motor shaft journaled therein, spur gearing driven by said motor shaft and including a driven spur gear having means engageable with said pump shaft, for driving said pump, a housing secured to the end of said casing and adapted to form a housing and bearing support means for said spur gearing, said housing having an apertured portion concentric with said driven spur gear opening to the end of said housing opposite from said motor and having suction and pressure passageways formed therein with inlet and outlet ports leading from and into said housing and disposed adjacent and opening to the same end of said housing as said apertured portion of said housing, said end plate of said pump being adapted to abut the end of said housing opposite from said motor and having a hollow boss extending therefrom and arranged concentrically with said shaft and adapted to engage within said apertured portion, to align said pump drive shaft with said drive means carried by said gear, and means for connecting said pump casing to said housing and for aligning said suction and pressure ports in said inner end plate with said inlet and outlet ports of said housing, and for securing said pump to said housing so said pump may receive fluid from and may transmit fluid through said housing without the use of external piping means.

3. In a mounting for a plurality of fluid pumps each of which has a plurality of rotors, a suction port leading to said rotors, a pressure port leading from said rotors, and a shaft for driving said rotors, a drive motor for said pumps, a housing secured to the end of said motor, said motor having a shaft extending within said housing, a gear on said shaft, a plurality of gears journaled in said housing and meshing with said gear, each of said last mentioned gears forming a means for driving one of said pumps, said housing having openings concentric with the axes of rotation of said gears and opening from said gears through the end of said housing opposite from said motor to permit said drive shafts of said pumps to extend therethrough and to be driven by said gears, and said housing having a plurality of pressure and suction ports therein opening through the end thereof opposite from said motor and adapted to register with said suction and pressure ports of said pumps when said drive shafts of said pumps are in driving connection with said gears, to permit said pumps to be secured to the end of said housing opposite from said motor and be driven from said motor and obtain fluid from said housing and deliver fluid under pressure through said housing without the use of external piping means.

4. In a mounting for a plurality of fluid pumps each of which has a plurality of rotors, a suction port leading to said rotors, a pressure port leading from said rotors, and a shaft for driving said rotors, a drive motor for said pumps, a housing secured to the end of said motor, said motor having a shaft extending within said housing, a gear on said shaft, a plurality of gears journaled in said housing and meshing with said gear, each of said last mentioned gears forming a means for driving one of said pumps, said housing having openings concentric with the axes of rotation of said gears and opening from said gears through the end of said housing opposite from said motor, to permit said drive shafts of said pumps to extend therethrough and be driven by said gears, said pumps having hollowed bosses extending from said pumps and concentric with the drive shafts thereof, said housing having a suction manifold formed therein leading from an outer side thereof and having suction ports leading from said housing and opening through the end thereof opposite from said motor adjacent said openings, and said housing having pressure ports opening into said housing through its end opposite from said motor, each of said pressure ports being adjacent one of said suction ports and said pressure ports communicating with separate passageways leading through said housing and opening to opposite sides of said housing in directions transverse to the axis of rotation of said motor shaft, said suction and pressure ports in the end of said housing being adapted to register with said suction and pressure ports of said pumps when said hollow bosses are in engagement with said openings concentric with said gears, whereby said pumps are secured to the outer end of said housing and are driven from said gears, and are operable to take fluid from said suction manifold and deliver fluid under pressure through said pressure passageways without any external piping between said pumps and housing.

5. In a mounting for a plurality of fluid pumps each of which has a plurality of rotors, a suction port leading to said rotors, a pressure port leading from said rotors, and a shaft for driving said rotors, a drive motor for said pumps, a housing secured to the end of said motor, said motor having a shaft extending within said housing, a gear on said shaft disposed within said housing, a plurality of gears journaled in said housing and meshing with said gear, each of said last mentioned gears forming a means for driving one of said pumps, said housing having openings concentric with the axes of rotation of said gears and opening from said gears through the outer end of said housing opposite from said motor, to permit said pump shafts of said pumps to extend therethrough and to have driving connection with said gears, said housing having an integral suction manifold formed therein common to all of said pumps and leading from an outer side thereof in a direction transverse to the axis of said motor shaft, and having a plurality of suction ports opening through the end of said housing opposite from said motor, each of said suction ports being adjacent one of said openings concentric with one of said gears and being adapted to register with a suction port of one of said pumps, a separate pressure passageway for each of said pumps formed integrally with said housing and leading from the outer sides of said housing in directions transverse to the axis of rotation of said motor shaft, a separate pressure port leading into each of said passageways through the end of said housing opposite from said motor and adapted to register with a pressure port of said pump, said pumps each having a hollow boss adapted to register with said opening concentric with said drive gears, and said suction and pressure ports in the end of said housing being adapted to register with suction and pressure ports of said pumps when said bosses are in engagement with said openings concentric with said drive gears, whereby said pumps are secured to the end of said housing opposite from said motor and are driven from said gears, and are operable to take fluid from said suction manifold and discharge it through said pressure passageways without any external piping connections between said pumps and said housing.

6. In combination, a plurality of fluid pumps, each of said pumps including a casing, a rotor mounted therein, a shaft for driving said rotor, and suction and pressure ports leading to and from said rotor, a single motor adapted to drive said pumps, a pump mounting for mounting said pumps on said motor including a housing adapted to be secured to the end of said motor and having a plurality of pump drive gears journaled therein and driven from said motor, said housing having a plurality of apertured portions, each of said apertured portions being concentric with the axis of rotation of one of said drive gears and providing openings to said drive gears, said housing having a suction manifold formed in the central portion thereof, with a plurality of suction ports leading therefrom through its end opposite from said motor, each of said suction ports being adjacent one of said apertured portions, said housing also having a plurality of independent pressure passageways formed therein, and each pressure passageway having a port opening leading through the end of said housing opposite from said motor adjacent one of said suction ports, each of said pumps having a projecting portion and each of said apertured portions being adapted to receive one of said projecting portions of said pumps to align the drive shaft of a respective pump with one of said drive gears to drive said pump from said drive gear, and each set of said pressure and suction ports in said housing being adapted to register with said pressure and suction ports of one of said pumps, whereby said pumps are operable to take fluid through said housing and to discharge fluid through said housing without the use of external piping means.

7. In a pump mounting for a fluid pump having intermeshing rotors for pumping fluid, a pump casing, pump shafts having pump rotors mounted thereon and journaled in said pump casing, inlet and outlet ports for said pump rotors opening from said casing in a direction parallel to the axis of said shafts, a motor for driving one of said pump shafts including gearing connecting said motor to one of said pump shafts, a housing for said gearing secured to one end of said motor, said pump casing having a hollow boss projecting therefrom and concentric with one of said pump shafts, said hollow boss being adapted to register with an opening in said housing for aligning one of said pump shafts with one of the gears of said gearing whereby said shaft is driven by said gearing, said housing having fluid passageways formed therein for supplying fluid to said pump casing and delivering fluid under pressure therefrom so as to form a manifold for said pump, and providing suction and pressure ports opening from said passageways through the end of said housing opposite from said motor, and adapted to register with said inlet and outlet ports, respectively, of said pump casing, whereby said housing affords a support for said pump casing with the inlet and outlet ports thereof in register with said supply passageway and said delivery passageway, respectively, and said housing also affording movement of fluid towards and from said pump casing without the use of external piping means.

WILLIAM W. SLOANE.

REFERENCES CITED

The following references are of record in the file of this patent:

UNITED STATES PATENTS

| Number | Name | Date |
|---|---|---|
| 1,965,937 | Ferris | July 10, 1934 |
| 2,185,338 | Hassler | Jan. 2, 1940 |
| 2,432,825 | Sloane | Dec. 16, 1947 |

FOREIGN PATENTS

| Number | Country | Date |
|---|---|---|
| 364,631 | Great Britain | Jan. 4, 1932 |
| 485,488 | Great Britain | May 20, 1938 |
| 846,828 | France | June 19, 1937 |